April 8, 1947. H. M. HUGE 2,418,643

MAGNETIC FREQUENCY CHANGER

Filed June 5, 1944   3 Sheets-Sheet 1

INVENTOR.
HENRY M. HUGE
BY Woodling and Krost
ATTORNEYS.

INVENTOR.
HENRY M. HUGE

INVENTOR.
HENRY M. HUGE

Patented Apr. 8, 1947

2,418,643

UNITED STATES PATENT OFFICE 2,418,643

MAGNETIC FREQUENCY CHANGER

Henry Martin Huge, Lorain, Ohio, assignor of one-half to Closman P. Stocker and one-half to E. M. Heavens Application June 5, 1944, Serial No. 538,840

22 Claims. (Cl. 172—281)

This invention pertains to magnetic frequency changers and in particular to a magnetic frequency changer for producing a great increase in frequency and adapted to be energized by a polyphase source of alternating current. The frequency changer of my invention is particularly applicable for supplying polyphase voltages of a high frequency.

It is an object of my invention to utilize saturating core means for supplying polyphase power of a relatively high frequency.

Another object of my invention is to generate a high order harmonic of an alternating current source.

Another object of my invention is to split the phases of a polyphase source by suitable windings on the saturable core structure, to magnetize it with an increased number of phases.

An additional object of my invention is to drive a polyphase induction motor with the output from my frequency multiplier.

A further object is to internally displace the phases between two frequency changing systems according to my invention so that the systems provide output voltages displaced in phase from each other for supplying polyphase output.

Still another object of my invention is to utilize polyphase capacitive exciting means to saturate magnetic core members of my frequency changer at a harmonic frequency.

Other objects and a fuller understanding of my invention may be obtained by referring to the following specifications and claims in conjunction with the accompanying drawings.

In general, the frequency changers made according to this invention use a magnetic core structure having a number of parallel flux paths magnetized from a polyphase source. The parallel flux paths consist of a number of primary flux paths and at least one secondary flux path in which the fundamental primary fluxes cancel so that the resultant flux in the secondary is of a harmonic frequency.

There are several core sections, each having the parallel primary and secondary flux paths. The different sections are magnetized with different phases of the energizing frequency by means of phase-splitting windings arranged thereon. When the frequency changer is applied to the generation of the ninth harmonic of the input frequency, there are three core sections, in each of which the primary core members are magnetized with three-phase fluxes and the magnetization of each section is displaced approximately 40 degrees from the other sections. The secondary fluxes are third harmonic and are displaced 120 degrees from each other. According to my invention I utilize capacitors to aid in magnetizing the secondary core members, to saturate them and thereby generate in them fluxes of the ninth harmonic of the source frequency. The ninth harmonic fluxes in the secondary core members are in phase with each other and therefore secondary windings can be connected in series to cancel the third harmonic voltages and supply a load with ninth harmonic voltage. By combining three more core sections with the first three and proportioning their primary windings to phase these sections 10 degrees away from the first three, I am able to obtain a second output phase, and when required, the two phases can be changed to a three-phase output by suitable secondary windings.

Figure 1:
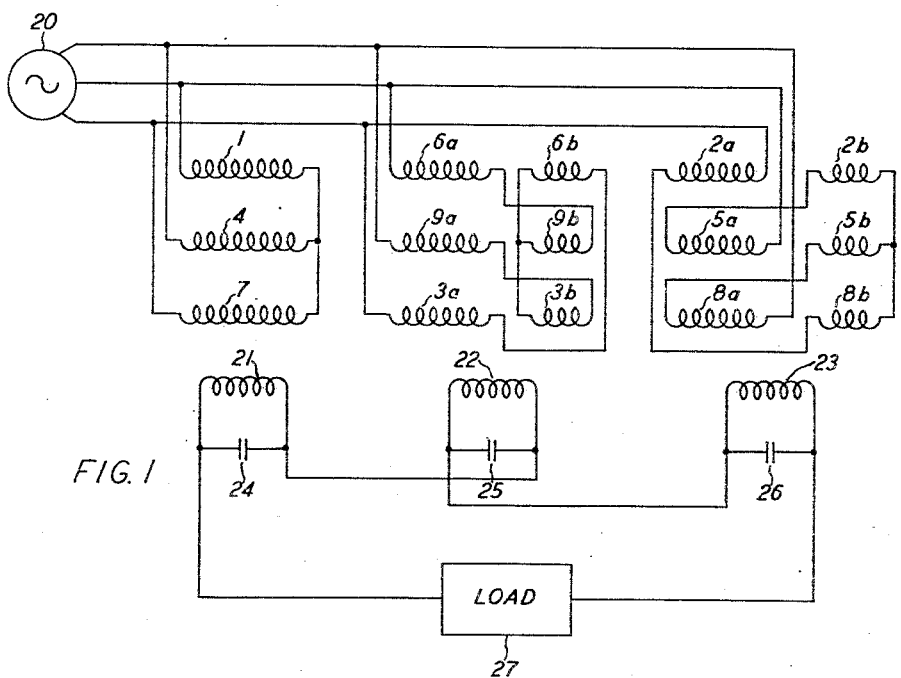
Figure 1 is the schematic diagram of a frequency changer made according to my invention and adapted to supply a single-phase output of nine times the source frequency.
Figure 2:
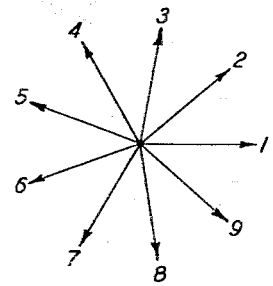
Figure 2 is a vector diagram showing the phase relationship between the fluxes produced with the arrangement of Figure 1.

With more particular reference to Figure 1 there is shown a three-phase source of alternating current 20 supplying nine primary windings. These windings are numbered to correspond with the phasing of the fluxes produced by them. The primary windings 1, 4 and 7 are star-connected directly to the three-phase source while the primary windings for the other six phases are split in order to produce the necessary phase relationship, thus, the windings 3b, 6b and 9b are star-connected and are connected to the three-phase source through phase-displacing windings. Winding 6b is connected in series with 3a, 3b is connected in series with 9a, and 9b is connected in series with 6a. Similarly, windings 2b, 5b and 8b are star-connected, winding 2b being connected in series with 5a, 5b in series with 8a, and 8b in series with 2a. The phase relationship produced by these phase-splitting windings is shown in Figure 2 with the numbered vectors representing the resultant fluxes produced by the windings bearing the corresponding numbers. For example, vector number 2 shows the relative phase position of the flux produced by windings 2a and 2b, which are wound on the same primary core member.

The secondary winding 21 has the third harmonic voltage from the windings 1, 4 and 7 induced in it, secondary winding 22 has the third harmonic voltage from primary windings 3, 6 and 9 and secondary winding 23 has the third harmonic voltage from primary windings 2, 5 and 8.

Capacitor 24 is connected across secondary winding 21, capacitor 25 across winding 22 and capacitor 26 across winding 23. These capacitors are energized with the third harmonic voltages appearing in the secondary windings and aid in magnetizing the secondary flux paths. Through their action it is possible to cause saturation of the secondary flux paths and thereby to generate high harmonics in them. In addition, the relatively high flux density of the third harmonic flux circulating through the primary flux paths also generates higher harmonics in the primary flux paths. In particular, the ninth harmonic is generated in both the primary and secondary flux paths and the phases of the ninth harmonic fluxes produced are the same in all the primary flux paths. This is true because the primary voltages are displaced 40 degrees from each other, which produces 360 degrees phase displacement at the ninth harmonic, or, in other words, makes the voltages in phase with each other. The capacitors 24, 25 and 26 are also energized with the ninth harmonic voltages induced in the secondary windings and are effective in aiding in the excitation of these voltages. Secondary windings 21, 22 and 23 are connected in series, with the ninth harmonic voltages adding and the third harmonic voltages cancelling so that the resultant voltage supplied to load 27 is ninth harmonic voltage with the lower frequencies cancelled out.

Figure 3:
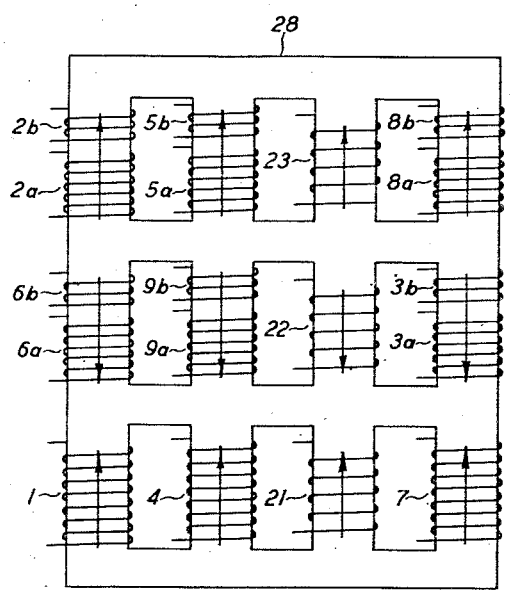
Figure 3 shows a saturable magnetic core structure on which the windings of Figure 1 may be arranged.

Figure 3 shows the magnetic core structure 28 upon which the nine primary coils are wound. The magnetic core structure 28 consists of three sections arranged in series with each other, each section comprising three primary flux paths and one secondary flux path arranged in parallel with each other. The secondary flux path is situated between two of the primary flux paths in the arrangement shown in Figure 3 but it is also possible to obtain the results described herein when the secondary flux path is one of the outer core members. The adjacent flux paths in series with each other are magnetized with fluxes phased 20 degrees apart, even though the primary voltages are phased 40 degrees apart. This is accomplished by reversing some of the phases, as indicated by the arrows drawn through the coils in Figure 3, to reduce the phase displacement. Thus, phase 1 and phase 6 magnetize adjacent serially related flux paths but phase 6 is reversed so that the actual fluxes in the two paths are only 20 degrees out of phase with each other. Phase 2 magnetizes the flux path adjacent to the one magnetized by phase 6 and its flux is likewise 20 degrees displaced from that of its adjacent serially related flux path. The primary flux paths in parallel with each other are magnetized 120 degrees out of phase with each other so that, for example, the sum of the fluxes of the energizing frequency produced by windings 1, 4 and 7 is practically zero and no fundamental frequency flux flows through secondary winding 21.

Figure 4:
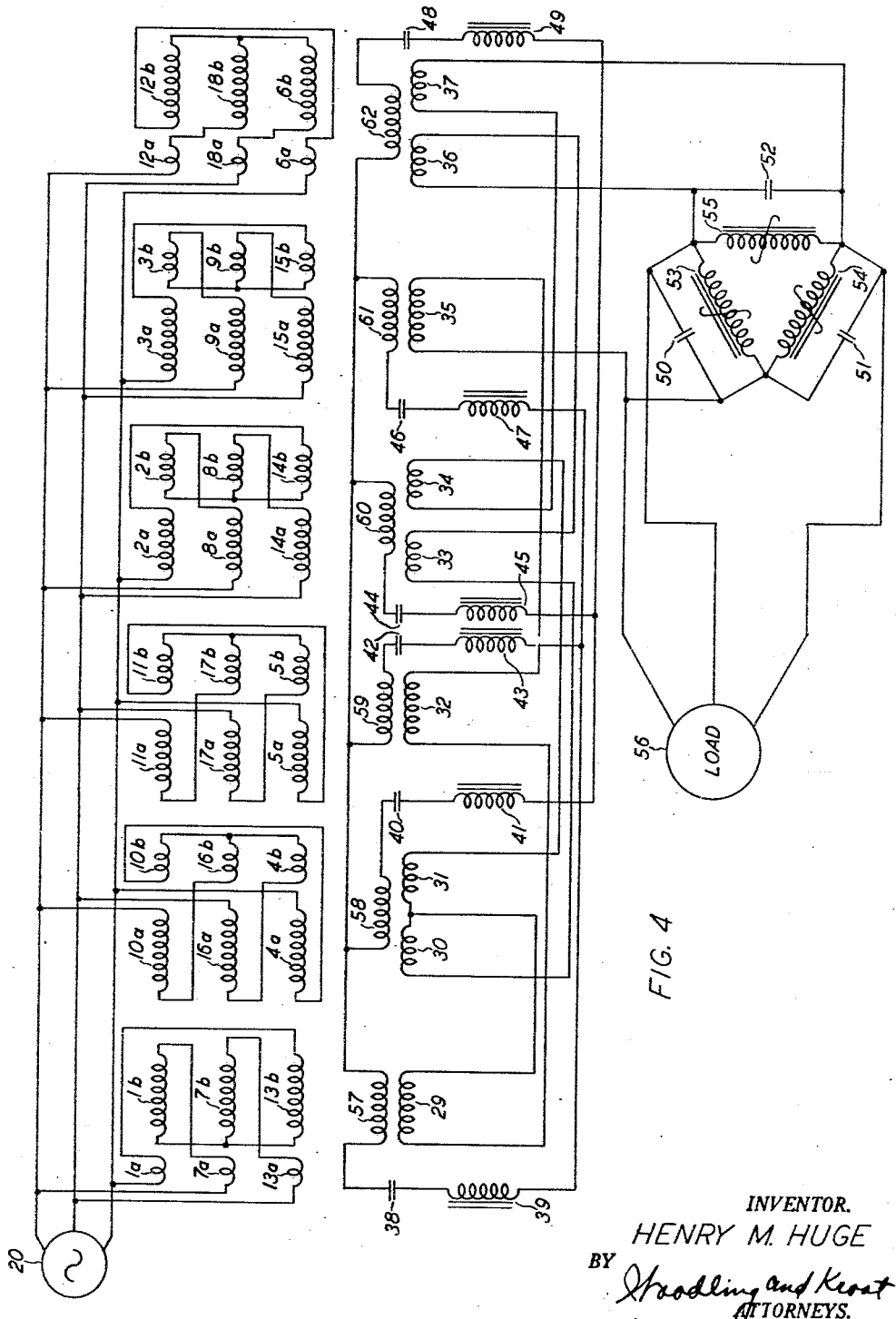
Figure 4 is the schematic diagram of an embodiment of my invention adapted to supply three-phase output of nine times the source frequency and applicable for supplying a three-phase induction motor.

Figure 4 is the schematic diagram of a frequency changer embodying features of my invention and adapted to supply a three-phase voltage of nine times the source frequency. The arrangement of Figure 4 makes use of two frequency changers similar to the one shown in Figure 1 arranged on a common core, and phased 10 degrees apart. The arrangement for shifting the phases in Figure 4 is the same as that described in connection with Figure 1. Each primary core member has two windings on it energized from different input phases with the proportioning of the windings selected to produce the resultant phase relationships shown in Figure 5. The 10 degree fundamental frequency displacement produces a 90 degree displacement between the ninth harmonic voltages.

The output windings which are on the secondary core members are arranged to change the two-phase voltage with 90 degrees phase displacement into a three-phase output voltage. For this purpose the output windings 29, 32 and 35 are connected in series in the same manner that secondary windings 21, 22 and 23 were connected in Figure 1. The secondary windings of the other three groups of windings are divided in order to provide for a Scott or T connection of the two-phase voltages. Output windings 30, 33 and 36 are connected in series, and serve as one-half of the horizontal bar of the T, while output windings 31, 34 and 37 are connected in series as the other half of the horizontal bar of the T. The vertical bar of the T is provided by output windings 29, 32 and 35.

The substantially balanced three-phase output voltage thus obtained is supplied to an output network consisting of three capacitors 50, 51 and 52 connected in parallel with three saturable inductances 53, 54 and 55. The capacitors are energized with the three-phase voltage of nine times the frequency of source 20 and aid in the excitation of this voltage. The saturable inductances connected in parallel with these capacitors stabilize the output voltage of the frequency changer by increasing the effective capacity of the network when the output voltage is below normal and by decreasing the effective capacity when the output voltage is above normal. This is brought about by the greatly increased inductive current passed by the inductances under high voltage.

In each case, the change in effective capacity is in the right direction to stabilize the output voltage at the normal level. This arrangement is particularly advantageous when the load 56 is a polyphase induction motor requiring a large exciting current during the starting interval. When load variations are not too great, the saturable inductances 53, 54 and 55 may be omitted.

In the arrangement of Figure 4 each of the secondary core members has an additional winding which is utilized for the capacitive excitation of the voltage of three times the frequency of source 20. These windings are numbered 57, 58, 59, 60, 61 and 62 and are star-connected to provide two three-phase systems of three times the source frequency. The voltages in these systems do not include large components of the output frequency, because of the cancellation of these voltages in the star-connection. The three-phase triple frequency system comprising windings 57, 59 and 61 energized from the odd-numbered primary phases energizes the star-connected capacitors 38, 42 and 46. Likewise, the three-phase triple frequency source comprising secondary windings 58, 60 and 62 energized from the even-numbered primary phases energizes the capacitors 40, 44 and 48. Each of the capacitors has connected in series with it a substantially linear inductance; inductance 39 is connected in series with capacitor 38, inductance 41 is connected in series with capacitor 40, inductance 43 in series with capacitor 42, inductance 45 in series with capacitor 44, inductance 47 in series with capacitor 46, and inductance 49 in series with capacitor 48. It is possible to obtain the required output power without the use of these inductances but I have found that their use enables the frequency changer to supply a substantially sinusoidal voltage over a wide range of load requirements. The capacitors 38, 40, 42, 44, 46 and 48 aid in the excitation of the polyphase third harmonic voltages and aid in magnetizing the secondary flux paths, making it possible to produce a high flux density in these flux paths to enhance the generation of the output frequency as described in connection with Figure 1. This excitation arrangement may also be applied advantageously to the circuit of Figure 1, as may also the method of stabilizing the output voltage which is shown in Figure 4.

Figure 5:
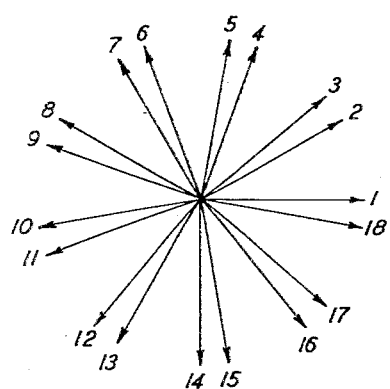
Figure 5 is a vector diagram showing the phase relationship between the fluxes produced by the arrangement of Figure 4.

Figure 5 is a vector diagram showing the phase relationship between the fluxes produced by the various coils in Figure 4. As previously mentioned, the odd-numbered phases are displaced 10 degrees from the preceding even-numbered phases.

Figure 6:
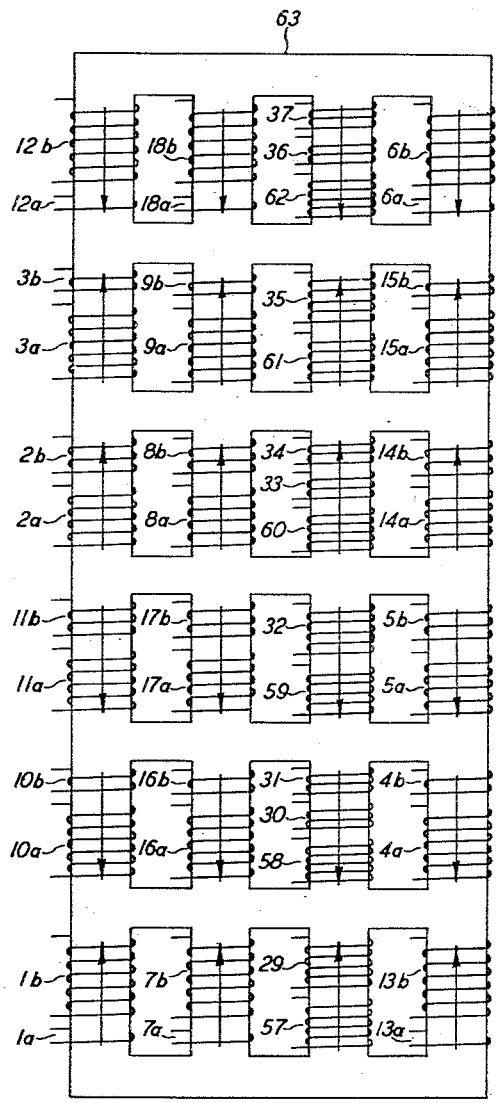
Figure 6 shows a saturable magnetic core structure on which the windings of Figure 4 may be arranged.

Figure 6 shows the common core structure 63 on which the coils of Figure 4 may be arranged. The arrangement of Figure 6 consists of six core sections in series with each other, each core section comprising three primary core members and one secondary core member in parallel with each other. The arrows drawn through the coils on Figure 6 indicate the relative polarization of the windings and it can be seen by referring to Figure 5 that the adjacent core members in series with each other are magnetized 10 degrees out of phase with each other. For example, phase number one and phase number 10 are on adjacent series core members with number 10 in reverse polarity so that they are phased 10 degrees apart. Phase number eleven is polarized the same as phase number ten so that once more the 10 degrees phase displacement is maintained. Phase number two is reversed with respect to phase number eleven to maintain the 10 degree displacement, and so on throughout the entire core structure. The primary core members of the same section are magnetized 120 degrees out of phase with each other as in Figure 3, and the flux of the energizing frequency is balanced out of the secondary core members.

It is possible to modify the arrangements of Figures 3 and 6 by providing a separate core structure for each of the core sections shown but the arrangement shown is preferred because of the reduced weight of iron required. The transverse core members are preferably made large enough so that the magnetizing force spent in them is small in comparison with the magnetizing force spent in the core members within the coils. This requires a relatively low flux density in the transverse core members. In the common core arrangements shown, this is accomplished with a relatively small cross-sectional area because of the large percentage of the flux of each primary core member which flows on through the adjacent series core member whose flux, in Figure 6, differs in phase by only 10 degrees.

The entire core structure shown in Figure 6 comprises a series-parallel magnetic circuit, but when it is considered as consisting of six core sections, the sections are evidently magnetically in series, while the core members of each section are magnetically in parallel.

Although the foregoing specification has been limited chiefly to a form of my invention adapted to supply an output frequency which is nine times the input frequency, it is possible to extend the principles described herein to the production of other harmonics of the input frequency and to other numbers of phases in both the input and output circuits.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. A frequency changer comprising in combination, saturable magnetic core means comprising three magnetic core sections, each section having three primary core members and one secondary core member arranged in a parallel magnetic circuit, star-connected primary winding means on the primary core members adapted to be energized by a polyphase alternating current source, the primary winding means on at least one of said core sections comprising a plurality of windings on each primary core member with each winding being connected in series with a winding on a different primary core member to magnetize the member in a displaced phase, secondary winding means on the secondary core members including an output winding on each of the three sections, said output windings being connected in series, with voltages of nine times the frequency of the source added substantially in phase, and a plurality of capacitors adapted to be energized with voltage of three times the source frequency.

2. A frequency changer comprising in combination, a saturable magnetic core structure having three core sections, each section having three primary core members in parallel with a secondary core member, phase splitting primary winding means on the primary core members adapted to be energized by a polyphase alternating current source, to produce substantially cancelling fluxes of the source frequency in the secondary core members, secondary winding means on the secondary core members including an output winding on each of the three sections, said output windings being connected in series to add voltages of nine times the source frequency and to substantially cancel voltages of three times the source frequency, and a plurality of capacitors connected to the secondary winding means.

3. A frequency changer comprising in combination, a saturable magnetic core structure having three core sections, each section having three primary core members magnetically in parallel with a secondary core member, star-connected primary winding means on the primary core members adapted to be energized by a polyphase source of alternating current, the primary winding means on at least one of said core sections comprising a plurality of windings on each primary core member, with each winding being connected in series with a winding on a different primary core member, the fluxes in serially related adjacent primary core members being phased substantially twenty degrees apart, the fluxes in primary core members of the same section being phased substantially one hundred twenty degrees apart, secondary winding means on the secondary core members, including an output winding on each of the three sections, said output windings being connected in series to add voltages of nine times the source frequency and to substantially cancel voltages of three times the source frequency, and three capacitors connected to the secondary winding means and adapted to be energized with three-phase voltage of three times the source frequency.

4. A frequency multiplier comprising a saturable magnetic core structure having three core sections, each section having three primary core members magnetically in parallel with a secondary core member, primary winding means on the primary core members adapted to be energized by a polyphase source of alternating current, the primary winding means on at least one of said core sections comprising a plurality of windings on each core member, with each winding being connected in series with a winding on another primary core member of the same section, the fluxes in serially related adjacent primary core members being phased substantially twenty degrees apart, the fluxes in primary core members of the same section being phased substantially 120 degrees apart, three output windings, one on each secondary core member, three capacitors, one connected across each output winding, the output windings being connected in series to add voltages of nine times the source frequency appearing therein.

5. A frequency multiplier comprising saturable magnetic core means comprising three core sections, each section having three primary core members magnetically in parallel with a secondary core member, phase-splitting primary winding means on the primary core members adapted to be energized by a polyphase source of alternating current, the fluxes in different primary core members of the same section being phased substantially 120 degrees apart, secondary winding means on the secondary core members adapted to be energized by flux of three times the source frequency in the secondary core members, the induced voltages of secondary windings of different sections being phased substantially 120 degrees apart, said secondary winding means including serially connected output windings on the three core sections, for supplying voltage of nine times the source frequency to a load, said secondary winding means also including an additional winding on each core section, said additional windings being star-connected, three capacitors connected to said additional windings and adapted to be energized with three-phase voltage of three times the source frequency, and a fourth capacitor adapted to be energized with nine times the source frequency.

6. A frequency multiplier comprising saturable magnetic core means comprising three core sections, each section having three primary core members magnetically in parallel with a secondary core member, phase-splitting primary winding means on the primary core members adapted to be energized by a polyphase source of alternating current, the fluxes in different primary core members of the same section being phased substantially 120 degrees apart, secondary winding means on the secondary core members adapted to be energized by flux of three times the source frequency in the secondary core members, the induced voltages of secondary windings of different sections being phased substantially 120 degrees apart, said secondary winding means including serially connected output windings on the three core sections, for supplying voltage of nine times the source frequency to a load, said secondary winding means also including an additional winding on each core section, said additional windings being star-connected, three capacitors and three substantially linear inductances, one inductance connected in series with each capacitor, said capacitors and inductances being adapted to be energized with three-phase voltage of three times the source frequency from said additional windings, a fourth capacitor and a saturable stabilizing inductance connected in parallel and connected to said output windings.

7. A frequency changer comprising in combination, saturable magnetic core means comprising three magnetic core sections, each section having three primary core members and one secondary core member arranged in a parallel magnetic circuit, star-connected primary winding means on the primary core members adapted to be energized from a three-phase alternating current source, the primary winding means on one of said core sections being connected directly to said source, the primary winding means on the other core sections comprising a plurality of windings on each primary core member, with each winding being connected in series with a winding on a different primary core member on the same section, to magnetize the member in a displaced phase, secondary winding means on the secondary core members, including an output winding on each of the three sections, said output windings being connected in series and adapted to supply a load with voltage of nine times the source frequency, and a plurality of capacitors adapted to be energized with voltage of three times the source frequency to aid in magnetizing the secondary core members.

8. A frequency changer comprising in combination, saturable magnetic core means comprising six magnetic core sections, each section having three primary core members and one secondary core member magnetically in parallel, star-connected phase-splitting primary winding means on the primary core members, adapted to be energized by a polyphase alternating current source, the phase displacement between fluxes in primary core members of the same section being substantially 120 degrees, secondary winding means on the secondary core members including an output winding on each of the six sections, said output windings being connected in series in groups of three to substantially cancel voltages of three times the source frequency and to provide a polyphase output voltage of nine times the source frequency, a group of six capacitors adapted to be energized with voltage of three times the source frequency and at least one capacitor adapted to be energized with voltage of nine times the source frequency.

9. In combination, a saturable magnetic core structure, comprising six core sections, each section having three primary core members and a secondary core member in parallel, primary winding means on each of said primary core members adapted to be energized from a polyphase source of alternating current, the primary winding means of at least one core section comprising a plurality of windings on each primary core member, with each winding connected in series with a winding on a different primary core member to magnetize the member in a displaced phase, the phase displacement between the fluxes in primary core members of the same section being substantially 120 degrees, the phase displacement between primary core members of adjacent sections being substantially 10 degrees, secondary winding means on the secondary core members, including an output winding on each of the six sections, said output windings being connected in series in groups of three to add voltages of nine times the source frequency and to substantially cancel voltages of three times the source frequency, said secondary winding means also including additional star-connected secondary windings, six capacitors, one connected to each of said additional windings to aid in the magnetization of said secondary core members, and a plurality of additional capacitors connected to said output windings and adapted to aid in the excitation of polyphase voltage of nine times the source frequency.

10. In combination, a saturable magnetic core structure, comprising six core sections, each section having three primary core members and a secondary core member in parallel, phase-splitting primary winding means on said primary core members adapted to be energized from a polyphase source of alternating current, the phase displacement between the fluxes in primary core members of the same section being substantially 120 degrees, the phase displacement between the fluxes in primary core members of adjacent sections being substantially 10 degrees, secondary winding means on the secondary core members, including an output winding on each of the six sections, said output windings being connected in series in groups of three to add voltages of nine times the source frequency and to substantially cancel voltages of three times the source frequency, said secondary winding means also including additional star-connected secondary windings, six capacitors, one connected to each of said secondary windings to aid in the magnetization of said secondary core members, and an output network comprising a plurality of capacitors and a plurality of saturable stabilizing inductances connected in parallel with said plurality of capacitors and adapted to be energized with polyphase voltage of nine times the source frequency.

11. In combination, a saturable magnetic core structure, comprising a plurality of core members in six sections, each section having three primary core members and a secondary core member in parallel, phase displacing primary winding means on said primary core members adapted to be energized from a polyphase source of alternating current and to magnetize said core members in displaced phases to produce cancelling fundamental frequency fluxes in said secondary core members and to produce third harmonic fluxes in said secondary core members, the phase displacement between third harmonic fluxes in adjacent sections being substantially 30 degrees, first polyphase capacitive means for aiding in the third harmonic magnetization of said secondary core members, output winding means on said secondary core members, serially connected to add in-phase voltages of nine times the energizing frequency and adapted to provide a polyphase output, and second polyphase capacitive means for aiding in the excitation of the output frequency.

12. A frequency changer comprising saturable magnetic core means having a plurality of primary core members and a plurality of secondary core members, phase-splitting primary winding means adapted to produce polyphase magnetization of said primary core members at a fundamental frequency and to produce substantially cancelling fluxes of the fundamental frequency in the secondary core members, capacitive means adapted to aid in the polyphase magnetization of the secondary core members at a harmonic frequency, and serially connected output winding means on the secondary core members phased to substantially cancel voltages of said harmonic frequency and to supply an output frequency which is a multiple thereof.

13. A frequency changer comprising saturable magnetic core means having a plurality of primary core members and a plurality of secondary core members, phase splitting primary winding means adapted to produce polyphase magnetization of said primary core members at a fundamental frequency and to produce substantially cancelling fluxes of the fundamental frequency in the secondary core members, star-connected secondary winding means connected to first capacitive means to aid in the polyphase magnetization of the secondary core members at a harmonic frequency, and serially connected secondary winding means connected to second capacitive means to aid in the magnetization of the secondary core members at a multiple of said harmonic frequency.

14. A frequency multiplier comprising saturable magnetic core means having three core sections, each section having three primary core members and one secondary core member, phase-splitting primary winding means on the primary core members for producing polyphase magnetization at a fundamental frequency and for producing substantially cancelling fluxes of the fundamental frequency in the secondary core members, capacitive means adapted to aid in the three-phase magnetization of the secondary core members at the third harmonic frequency, and serially connected output winding means on the secondary core members phased to substantially cancel third harmonic voltages and to supply a ninth harmonic output voltage.

15. A frequency multiplier comprising saturable magnetic core means having three core sections, each section having three primary core members and one secondary core member, phase-splitting primary winding means on the primary core members for producing polyphase magnetization of the primary core members at a fundamental frequency and for producing substantially cancelling fluxes of the fundamental frequency in the secondary core members, star-connected secondary winding means connected to first capacitive means, to aid in the three-phase third harmonic magnetization of the secondary core members, and serially connected secondary winding means for supplying ninth harmonic voltage to second capacitive means for aiding in the ninth harmonic magnetization of the secondary core members.

16. A frequency multiplier comprising saturable magnetic core means having three core sections, each section having three primary core members and one secondary core member, phase-splitting primary winding means on the primary core members for producing polyphase magnetization of the primary core members at a fundamental frequency and for producing substantially cancelling fluxes of the fundamental frequency in the secondary core members, star-connected secondary winding means connected to first capacitive means in series with substantially linear inductive means, to aid in the three-phase third harmonic magnetization of the secondary core members, and serially connected secondary winding means for supplying ninth harmonic voltage to second capacitive means for aiding in the ninth harmonic magnetization of the secondary core members.

17. A frequency multiplier comprising saturable magnetic core means having six core sections, each section having three primary core-members and one secondary core member, phase splitting primary winding means on the primary core members for producing polyphase magnetization at a fundamental frequency and for producing substantially cancelling fluxes of the fundamental frequency in the secondary core members, capacitive means adapted to aid in the three-phase third harmonic magnetization of groups of three of the secondary core members, and output winding means on the secondary core members serially connected in groups of three and phased to substantially cancel third harmonic voltages and to supply a polyphase ninth harmonic output voltage.

18. A frequency multiplier comprising saturable magnetic core means having six core sections, each section having three primary core members and one secondary core member, phase-splitting primary winding means on the primary core members for producing polyphase magnetization at a fundamental frequency and for producing substantially cancelling fluxes of the fundamental frequency in the secondary core members, star-connected secondary winding means connected to two groups of capacitors with three capacitors in each group, to aid in the three-phase third harmonic magnetization of groups of three of the secondary core members, and secondary winding means serially connected in groups of three for supplying polyphase ninth harmonic voltage to a third group of capacitors for aiding in the ninth harmonic magnetization of the secondary core members.

19. A frequency multiplier comprising saturable magnetic core means having six core sections, each section having three primary core members and one secondary core member, phase-splitting primary winding means on the primary core members for producing polyphase magnetization at a fundamental frequency and for producing substantially cancelling fluxes of the fundamental frequency in the secondary core members, star-connected secondary winding means connected to two groups of capacitors and substantially linear inductances, with three capacitors in each group and a substantially linear inductance in series with each capacitor, to aid in the three-phase third harmonic magnetization of groups of three of the secondary core members, and secondary winding means serially connected in groups of three for supplying polyphase ninth harmonic voltage to a third group of capacitors for aiding in the ninth harmonic magnetization of the secondary core members.

20. A frequency multiplier comprising saturable magnetic core means having six core sections, each section having three primary core members and one secondary core member magnetically in parallel, star-connected phase-splitting primary winding means on the primary core members for producing polyphase magnetization thereof at a fundamental frequency, and for producing substantially cancelling fluxes of the fundamental frequency in the secondary core members, star-connected secondary winding means connected to two groups of capacitors with three capacitors in each group, to aid in the three-phase third harmonic magnetization of groups of three of the secondary core members, and secondary winding means serially connected in groups of three for supplying three-phase ninth harmonic voltage to a third group of three delta-connected capacitors for aiding in the ninth harmonic magnetization of the secondary core members.

21. A frequency multiplier comprising saturable magnetic core means having six core sections, each section having three primary core members and one secondary core member magnetically in parallel, star-connected phase-splitting primary winding means on the primary core members for producing polyphase magnetization thereof at a fundamental frequency, and for producing substantially cancelling fluxes of the fundamental frequency in the secondary core members, star-connected secondary winding means connected to two groups of capacitors and substantially linear inductances, with three capacitors in each group and a substantially linear inductance in series with each capacitor, to aid in the three-phase third harmonic magnetization of groups of three of the secondary core members, and secondary winding means serially connected in groups of three for supplying three-phase ninth harmonic voltage to a third group of three capacitors for aiding in the ninth harmonic magnetization of the secondary core members.

22. A frequency changer comprising saturable magnetic core means having a plurality of primary core members and a plurality of secondary core members, phase-splitting primary winding means adapted to produce polyphase magnetization of said primary core members at a fundamental frequency and to produce substantially cancelling fluxes of the fundamental frequency in the secondary core members, first capacitive means adapted to aid in the polyphase magnetization of the secondary core members at a harmonic frequency, serially connected output winding means on the secondary core members phased to substantially cancel voltages of said harmonic frequency and to supply an output frequency which is a multiple thereof, and output stabilizing means comprising parallel connected saturable inductive and second capacitive means connected across the output winding means.

HENRY MARTIN HUGE.

REFERENCES CITED

The following references are of record in the file of this patent:

UNITED STATES PATENTS

| Number | Name | Date |
|---|---|---|
| 1,381,626 | Fuller | June 14, 1921 |